(12) United States Patent
Dudar

(10) Patent No.: US 11,473,538 B2
(45) Date of Patent: Oct. 18, 2022

(54) METHODS AND SYSTEMS TO DECREASE CHARGE AIR COOLER CONDENSATE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/183,029

(22) Filed: Feb. 23, 2021

(65) Prior Publication Data

US 2022/0268244 A1 Aug. 25, 2022

(51) Int. Cl.
  *F02M 31/20* (2006.01)
  *F02M 25/08* (2006.01)
  *F02B 29/04* (2006.01)

(52) U.S. Cl.
  CPC ......... *F02M 31/20* (2013.01); *F02B 29/0468* (2013.01); *F02M 25/08* (2013.01); *F02M 25/089* (2013.01); *F02M 25/0854* (2013.01); *F02D 2250/41* (2013.01); *F02M 2025/0881* (2013.01)

(58) Field of Classification Search
  CPC .... F02M 31/20; F02M 25/08; F02M 25/0854; F02M 25/089; F02M 2025/0881; F02M 26/03; F02M 31/205; F02M 33/06; F02M 33/08; F02M 25/0836; F02M 2025/0863; F02B 29/0468; F02B 33/443; F02D 2250/41
  USPC .......................... 123/563, 519, 518, 520–521
  See application file for complete search history.

(56) References Cited

U.S. PATENT DOCUMENTS

| | | | | |
|---|---|---|---|---|
| 3,221,724 A | * | 12/1965 | Wentworth | F02M 25/08 55/501 |
| 3,757,753 A | * | 9/1973 | Hunt | F02M 25/089 96/136 |
| 4,480,439 A | * | 11/1984 | Yamane | F02B 29/0443 60/599 |
| 6,367,256 B1 | * | 4/2002 | McKee | F02M 26/47 60/605.2 |
| 6,698,403 B2 | * | 3/2004 | Honda | F02M 25/08 123/557 |
| 6,748,741 B2 | * | 6/2004 | Martin | F02M 35/022 60/599 |
| 7,125,439 B2 | * | 10/2006 | Bennett | B01D 53/047 96/121 |
| 7,251,937 B2 | * | 8/2007 | Appleton | F02B 29/0468 60/599 |
| 7,444,996 B2 | * | 11/2008 | Potier | F02M 25/08 123/519 |
| 8,191,366 B2 | * | 6/2012 | Taylor | F02B 29/0468 60/599 |

(Continued)

*Primary Examiner* — Sizo B Vilakazi
*Assistant Examiner* — Brian R Kirby
(74) *Attorney, Agent, or Firm* — Vincent Mastrogiacomo; McCoy Russell LLP

(57) ABSTRACT

Methods and systems are provided for removing condensate form a charge air cooler coupled to an engine intake system. In one example, a method may include flowing heated air from a fuel vapor canister of an evaporative emissions control (EVAP) system through the charge air cooler to vaporize condensate in the CAC. The air is drawn in from atmosphere by operating an electric booster in a reverse direction and the air is heated at the canister by operating a canister heater.

19 Claims, 6 Drawing Sheets

(56) References Cited

U.S. PATENT DOCUMENTS

| | | | |
|---|---|---|---|
| 8,271,183 B2* | 9/2012 | Uhrich | F02D 41/0007 123/520 |
| 8,961,368 B2 | 2/2015 | Glugla | |
| 9,010,112 B2 | 4/2015 | Palm | |
| 9,051,890 B2* | 6/2015 | Surnilla | F02D 43/04 |
| 9,145,823 B2 | 9/2015 | Glugla et al. | |
| 9,151,214 B2 | 10/2015 | Glugla et al. | |
| 9,188,056 B2 | 11/2015 | Glugla et al. | |
| 9,239,020 B2* | 1/2016 | Fulton | F02B 29/0468 |
| 9,267,424 B2 | 2/2016 | Wicks et al. | |
| 9,322,348 B2* | 4/2016 | Yang | F02D 41/0032 |
| 9,359,923 B2* | 6/2016 | Pursifull | F01M 13/02 |
| 9,359,964 B2 | 6/2016 | Glugla et al. | |
| 9,382,836 B2 | 7/2016 | Maceroni et al. | |
| 9,938,913 B2* | 4/2018 | Dudar | F02B 29/0406 |
| 9,976,503 B2 | 5/2018 | Surilla et al. | |
| 10,502,167 B2* | 12/2019 | Martin | F01N 3/2093 |
| 10,563,571 B2* | 2/2020 | Kindi | F02B 33/40 |
| 10,711,686 B2* | 7/2020 | Grosch | F02B 39/10 |
| 10,859,044 B2* | 12/2020 | Dudar | F02M 35/10229 |
| 2002/0162457 A1* | 11/2002 | Hyodo | F02M 25/0872 96/144 |
| 2002/0189256 A1* | 12/2002 | Kalish | F02M 35/10026 60/605.2 |
| 2007/0107425 A1 | 5/2007 | Appleton | |
| 2010/0229549 A1 | 9/2010 | Taylor | |
| 2010/0332075 A1* | 12/2010 | Clarke | F02M 26/42 701/33.4 |
| 2011/0072792 A1* | 3/2011 | Bidner | F02D 41/029 60/296 |
| 2011/0185991 A1* | 8/2011 | Sheidler | F02B 29/0418 123/41.09 |
| 2013/0160746 A1* | 6/2013 | Woods | F02M 33/06 123/521 |
| 2014/0048048 A1 | 2/2014 | Glugla et al. | |
| 2014/0048049 A1* | 2/2014 | Glugla | F02D 41/0007 123/563 |
| 2014/0100074 A1* | 4/2014 | Glugla | F02D 41/0005 477/3 |
| 2014/0102424 A1 | 4/2014 | Norman | |
| 2014/0150755 A1* | 6/2014 | Cunningham | F02M 31/042 123/563 |
| 2014/0157772 A1* | 6/2014 | Glugla | F02B 29/0406 60/599 |
| 2014/0158089 A1* | 6/2014 | Glugla | F02M 26/05 123/403 |
| 2014/0299111 A1* | 10/2014 | Denz | F02M 25/0836 123/184.47 |
| 2015/0345371 A1* | 12/2015 | Russ | F02B 37/22 123/542 |
| 2016/0177813 A1* | 6/2016 | Styles | F02D 41/0002 123/542 |
| 2017/0002773 A1* | 1/2017 | Segawa | F02B 37/00 |
| 2017/0114732 A1* | 4/2017 | Dudar | F02M 25/0854 |
| 2017/0145933 A1* | 5/2017 | Dudar | F02B 29/0406 |
| 2019/0010860 A1* | 1/2019 | Grosch | F02B 29/0406 |
| 2019/0078505 A1* | 3/2019 | Yashiro | F02B 33/34 |
| 2019/0107081 A1* | 4/2019 | Dudar | F02D 41/0037 |
| 2019/0120180 A1* | 4/2019 | Martin | F01N 3/2093 |
| 2019/0145331 A1* | 5/2019 | Dudar | F02D 41/0007 123/519 |
| 2019/0170057 A1* | 6/2019 | Lasecki | F02B 29/0468 |

* cited by examiner

METHODS AND SYSTEMS TO DECREASE CHARGE AIR COOLER CONDENSATE

FIELD

The present description relates generally to methods and systems for removal of condensate from within a charge air cooler in an engine intake system.

BACKGROUND/SUMMARY

Engines may utilize a turbocharger and/or supercharger to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, condensate may collect at the bottom of the CAC, or in the internal passages of the CAC. When torque is increased, such as during acceleration, increased mass air flow may strip the condensate from the CAC, drawing it into the engine and increasing the likelihood of engine misfire and combustion instability. Also, condensate accumulated over time on the CAC may cause rusting and mechanical wear of CAC.

Various approaches have been used to address condensate formation in the CAC. Condensate build-up in the CAC may also be addressed by removing condensate from the CAC before it builds up to a threshold level by increasing airflow through the CAC. For example, as shown by Russ et. al. in US 2014/0048048, adjusting a valve positioned in an inlet tank of a variable volume CAC may adjust the airflow rate through the CAC. Increased airflow through the CAC may reduce condensate build-up in the CAC.

However, the inventors herein have recognized potential issues with such systems. As one example, a variable volume CAC may require additional parts and controls for controlling airflow through the CAC. Such additional components may add to the cost and complexity of the system. Other attempts to address engine misfire due to condensate ingestion involve avoiding condensate build-up. However, potential issues have also been recognized with such methods. Specifically, while some methods may reduce or slow condensate formation in the CAC, condensate may still build up over time. If this build-up cannot be stopped, ingestion of the condensate during acceleration may cause engine misfire. Another method to reduce engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

In one example, the issues described above may be addressed by an engine, comprising: flowing heated air from a fuel vapor canister of an evaporative emissions control (EVAP) system through a charge air cooler (CAC) in an intake system to vaporize condensate in the CAC, the air heated at the canister by operating a canister heater. In this way, by purging condensate accumulated in the CAC, engine operation may be improved.

As one example, vehicle evaporative emission control systems may be configured to store fuel vapors from fuel tank refueling and diurnal engine operations in a canister, and then purge the stored vapors during a subsequent engine operation. The canister may include a heater for assisting with desorption of fuel vapor deposited within the activated carbon contained in the canister during purging of the fuel vapor to the engine. The engine may also comprise a battery operated electric booster (e-Booster) used for providing additional boost during increased torque demand. During conditions including an engine off event and a lower canister loading, upon increased possibility of CAC condensate accumulation, a condensate purge routine may be carried out. The canister may be isolated from the fuel tank and the canister heater may be activated for generation of heat within the canister. A canister purge valve (CPV) and a canister vent solenoid valve (CVS) may be opened to establish fluidic communication between the atmosphere, the canister, and the CAC via the intake manifold. The e-Booster may be operated in a reverse direction to generate vacuum in the intake manifold. The heated air generated at the canister may then be routed to the CAC where the heated air may remove any condensate deposited in the CAC to an air filter including a hydrogen trap housed in the intake passage. Heat from the air may vaporize the condensate at the CAC, the intake passage, or at the air filter.

In this way, by routing heated air through the CAC, condensate accumulate in the CAC may be periodically and/or opportunistically removed. By reducing the amount of condensate within the CAC, engine misfire and/or unstable combustion due to ingestion of large amounts of condensate may be reduced. Also, by removing condensate from the CAC, wear and degradation of the CAC and associated engine components may be reduced. The technical effect of reverse spinning the e-Booster is that the intake vacuum may facilitate heated air from the canister to be effectively channelized through the CAC, thereby drying the CAC. By routing the heated air through the intake air filter, any hydrocarbon in the air may be adsorbed at the filter. By using existing engine components for CAC condensate purging, cost and complexity of additional hardware may be eliminated. Overall, by maintaining a dry CAC, engine operation and fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for removal of condensate from within a charge air cooler (CAC) housed in an engine intake system. Removal of the condensate may be carried out by operating an electric booster and a heater of an evaporative emissions control system canister and flowing heated air through the CAC. Such methods may include spinning or rotating the electric booster via an electric motor of a hybrid vehicle, such as the hybrid vehicle depicted at FIG. 1. An onboard engine system including the electric booster, a fuel system and an evaporative emissions system, as depicted at FIG. 2A, 2B may be operated in a first mode during purging of the fuel vapor canister and in a second mode during cleaning of the CAC. For spinning the electric booster in the forward and reverse directions, an H-bridge circuit may be utilized, such as the H-bridge circuit depicted at FIGS. 3A-3B. An engine controller may be configured to perform a control routine, such as the example routine of FIG. 4, to remove any condensate deposited on the CAC. An example removal of CAC condensate is further shown in FIG. 5.

Figure 1:
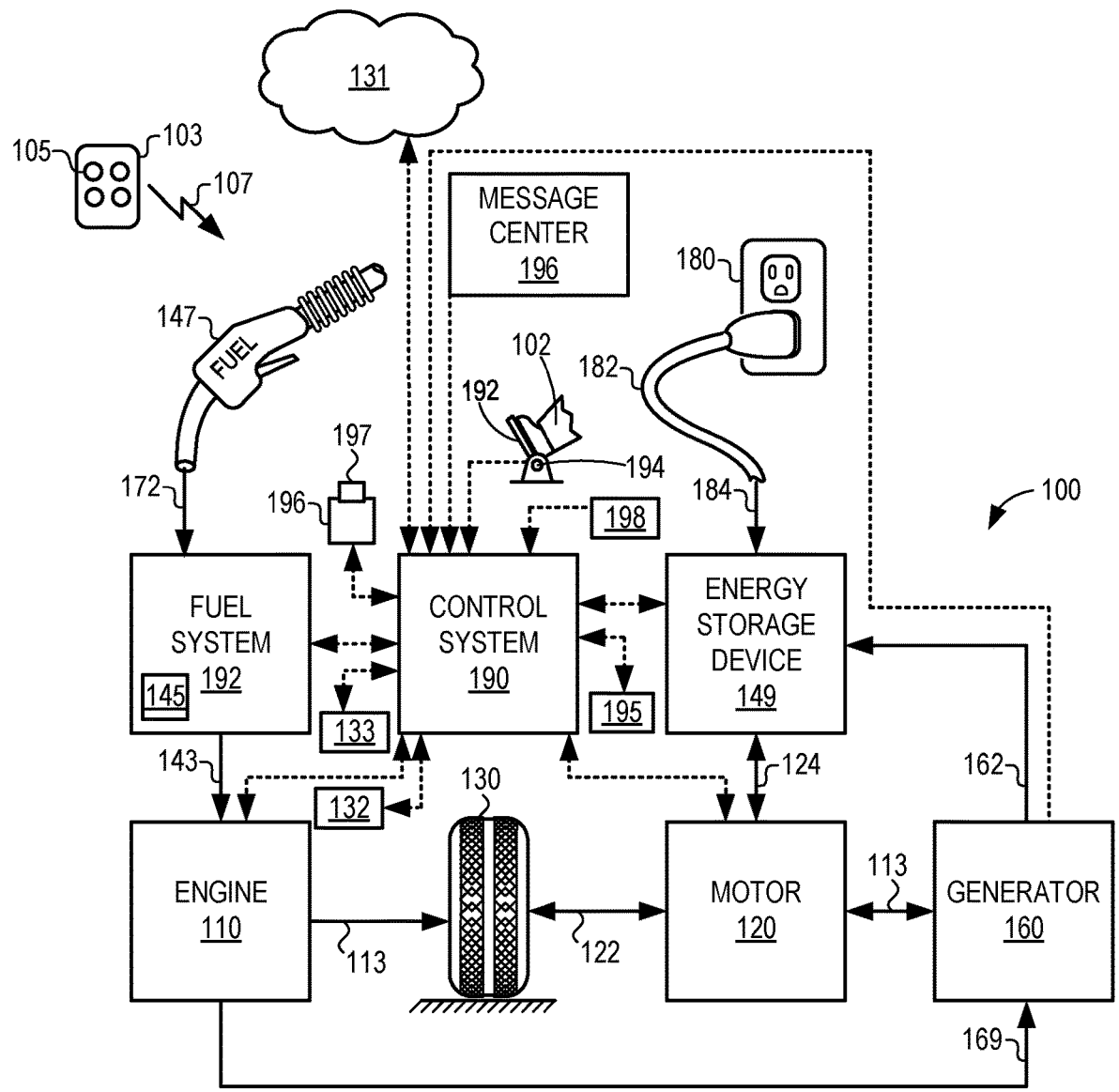
FIG. 1 schematically shows an example vehicle propulsion system
Figure 2A:
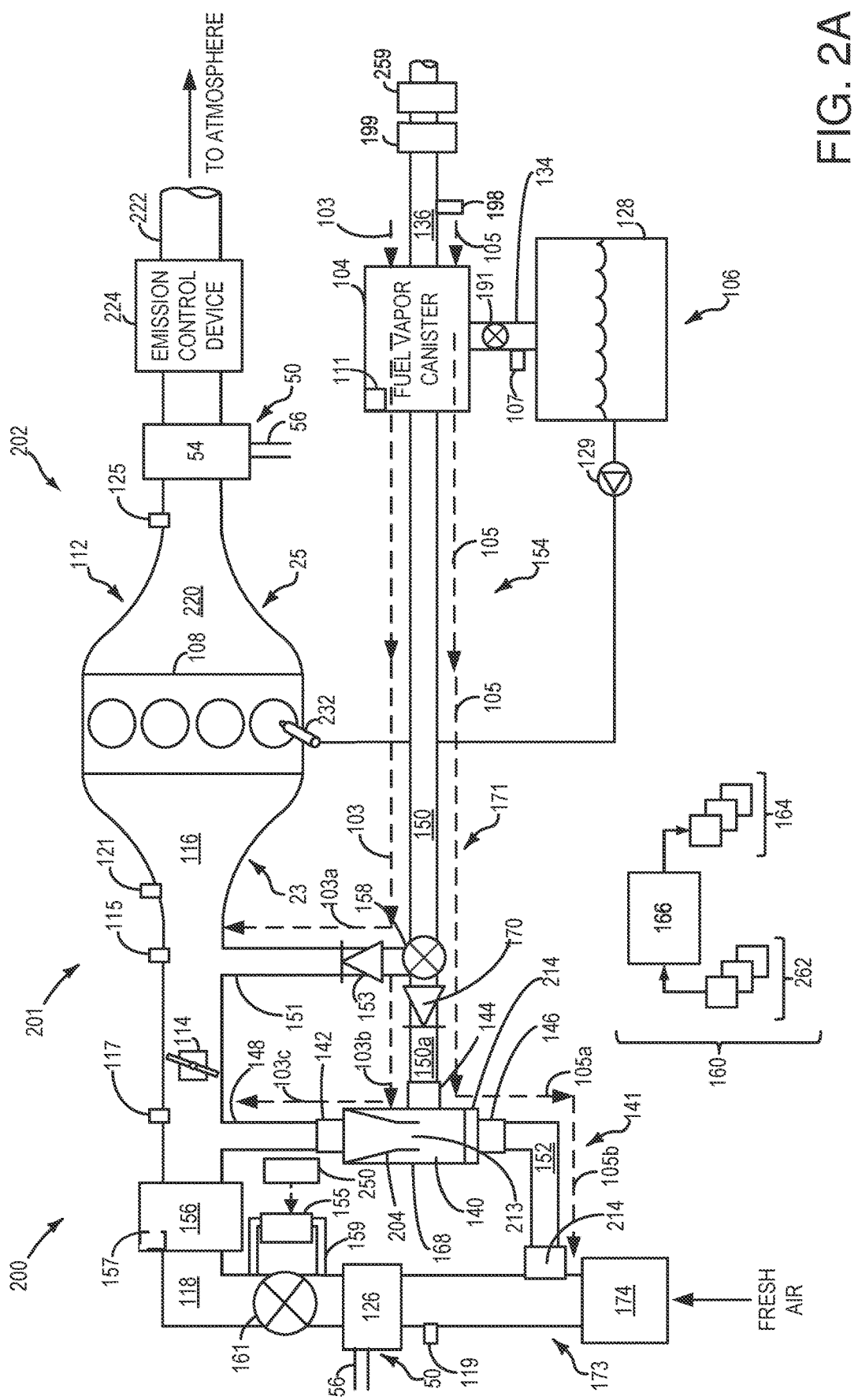
FIG. 2A shows a first schematic diagram of an engine system including a fuel vapor recovery system, an electric booster, and a charge air cooler operating in a first mode.
Figure 2B:
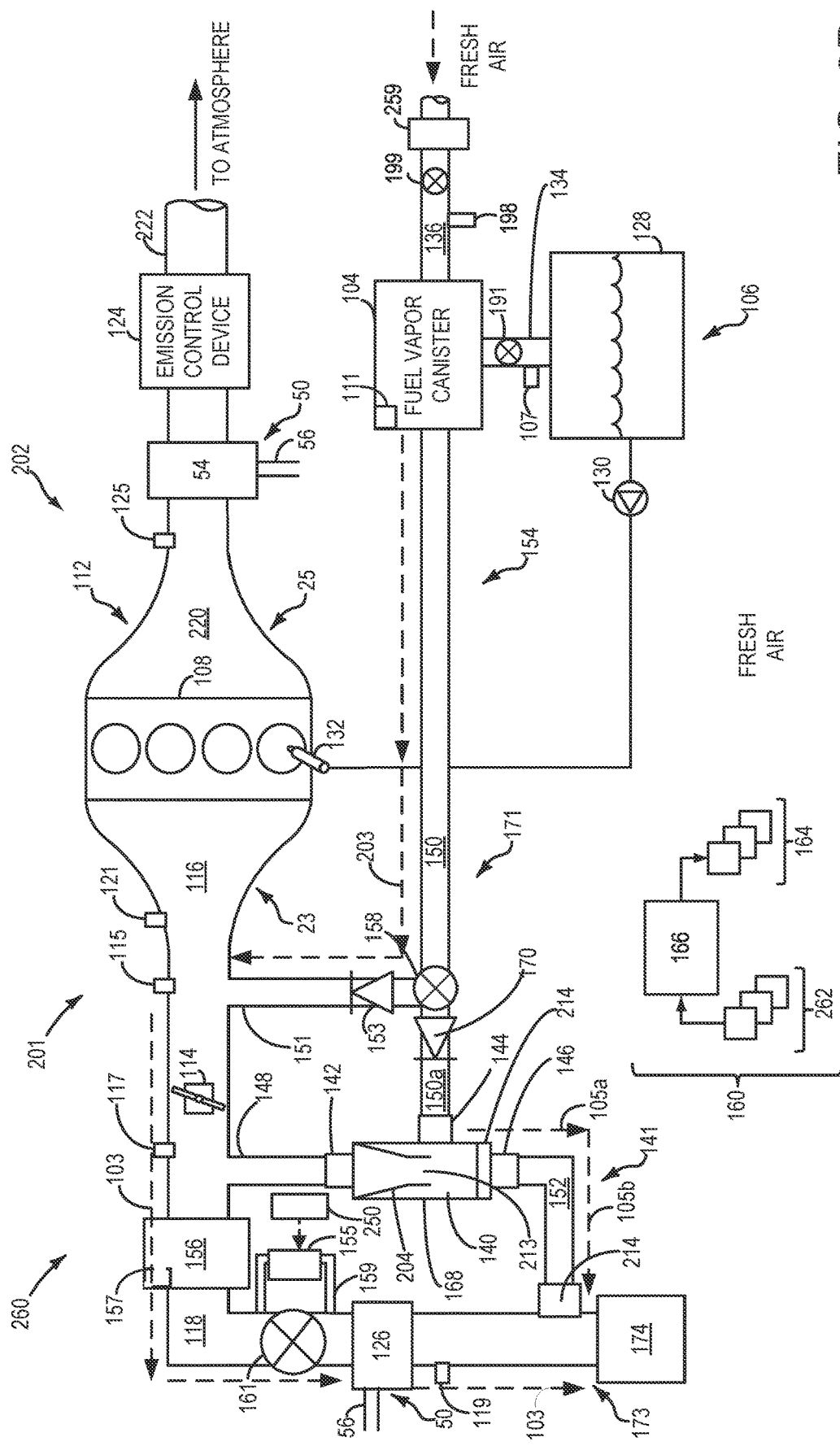
FIG. 2B shows a second schematic diagram of the engine system operating in a second mode.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 149. For example, motor 120 may receive wheel torque from drive wheel 130 as indicated by arrow 122 where the motor may convert the kinetic energy of the vehicle to electrical energy for storage at energy storage device 149 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 149 as indicated by arrow 162.

During still other operating conditions, engine 110 may be operated by combusting fuel received from fuel system 192 as indicated by arrow 143. For example, engine 110 may be operated to propel the vehicle via drive wheel 130 as indicated by arrow 113 while motor 120 is deactivated. During other operating conditions, both engine 110 and motor 120 may each be operated to propel the vehicle via drive wheel 130 as indicated by arrows 113 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 169, which may in turn supply electrical energy to one or more of motor 120 as indicated by arrow 113 or energy storage device 149 as indicated by arrow 162. As another example, engine 110 may be operated to drive motor 120 which may in turn provide a generator function to convert the engine output to electrical energy, where the electrical energy may be stored at energy storage device 149 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 149, which may include a battery, for example. In a case where motor 120 is used to rotate the engine unfueled, fuel injection to engine cylinders may be prevented, and spark may not be provided to each of the engine cylinders.

Fuel system 192 may include one or more fuel storage tanks 145 for storing fuel on-board the vehicle. For example, fuel tank 145 may store one or more liquid fuels, including but not limited to: gasoline, diesel, and alcohol fuels. In some examples, the fuel may be stored on-board the vehicle as a blend of two or more different fuels. For example, fuel tank 145 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 143. Still other suitable fuels or fuel blends may be supplied to engine 110, where they may be combusted at the engine to produce an engine output. The engine output may be utilized to propel the vehicle as indicated by arrow 113 or to recharge energy storage device 149 via motor 120 or generator 160.

In some examples, energy storage device 149 may be configured to store electrical energy that may be supplied to other electrical loads residing on-board the vehicle (other than the motor), including operating an electric booster (supercharger), cabin heating and air conditioning, engine starting, headlights, cabin audio and video systems, etc. As a non-limiting example, energy storage device 149 may include one or more batteries and/or capacitors.

Control system 190 may communicate with one or more of engine 110, motor 120, fuel system 192, energy storage device 149, and generator 160. Control system 190 may receive sensory feedback information from one or more of engine 110, motor 120, fuel system 192, energy storage device 149, and generator 160. Further, control system 190 may send control signals to one or more of engine 110, motor 120, fuel system 192, energy storage device 149, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 107 from a key fob 103 having a remote start button 105. In other examples (not shown), a remote engine start may be initiated via a cellular telephone, or smartphone based system where a user's cellular telephone sends data to a server and the server communicates with the vehicle to start the engine.

The vehicle system 100 may include a human machine interface (HMI) 133 coupled to the vehicle dashboard via which an operator may communicate with the control system 190. The HMI 133 may include a touch-sensitive display screen.

Energy storage device 149 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 149 from power source 180 via an electrical energy transmission cable 182. During a recharging operation of energy storage device 149 from power source 180, electrical transmission cable 182 may electrically couple energy storage device 149 and power source 180. While the vehicle propulsion system is operated to propel the vehicle, electrical transmission cable 182 may disconnected between power source 180 and energy storage device 149. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 149 from power source 180. For example, energy storage device 149 may receive electrical energy from power source 180 via one or more of electromagnetic induction, radio waves, and electromagnetic resonance. As such, it should be appreciated that any suitable approach may be used for recharging energy storage device 149 from a power source that does not comprise part of the vehicle. In this way, motor 120 may propel the vehicle by utilizing an energy source other than the fuel utilized by engine 110.

Fuel system 192 may periodically receive fuel from a fuel source residing external to the vehicle. As a non-limiting example, vehicle propulsion system 100 may be refueled by receiving fuel via a fuel dispensing device 147 as indicated by arrow 172. In some examples, fuel tank 145 may be configured to store the fuel received from fuel dispensing device 147 until it is supplied to engine 110 for combustion. In some examples, control system 190 may receive an indication of the level of fuel stored at fuel tank 145 via a fuel level sensor. The level of fuel stored at fuel tank 145 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s). The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters and ambient conditions such as local barometric pressure and humidity. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., may be additionally or alternatively utilized in conjunction with the onboard navigation system to conduct route learning of commonly traveled routes by the vehicle.

FIG. 2A shows a first schematic depiction 200 of the vehicle system 201 operating in a first mode. The vehicle system includes an engine system 202 coupled to a fuel vapor recovery system (evaporative emissions control system) 154 and a fuel system 106. The engine system 202 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 220 leading to an exhaust passage 222 that routes exhaust gas to the atmosphere. The engine exhaust 222 may include one or more emission control devices 224, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 220 and emission control device 224 in exhaust passage 222. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine 54 via a turbine bypass passage as controlled by a wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

To assist the turbocharger, an electric booster 155 (eBooster) may be incorporated into the vehicle propulsion system downstream of the compressor 126. Electric booster 155 may be powered via an onboard energy storage device 250, which may comprise a battery, capacitor, supercapacitor, etc. Electric booster 155 may be a supercharger used for further increasing air pressure of air exiting the compressor 126. In one example, electric booster 155 may be activated (actuated on) in response to a demand for wheel torque, in order to provide the desired boost air rapidly to the engine without delay as may otherwise occur if the turbocharger was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. controller 12). For example, the controller may send a signal to an electric booster actuator, which may actuate on the electric booster. In another example, the controller may send a signal to the electric booster actuator, which may actuate off the electric booster. In one example the electric booster actuator may comprise a motor which drives the compression of air.

Electric booster 155 may be housed in an electric booster conduit 159. The electric booster conduit 159 may be fluidically coupled at both ends to the intake passage 188 across the electric booster bypass valve 161. As an example, air may be drawn into electric booster 155 via the electric booster conduit 159 upstream of electric booster bypass valve 161, and compressed air may exit electric booster 155 and be routed via second electric booster conduit to intake passage 118 downstream of electric booster bypass valve 161. In this way, compressed air may be routed to engine intake 244.

In circumstances where the electric booster 155 is activated to provide boost more rapidly than if the turbocharger were solely relied upon, it may be understood that electric booster bypass valve 161 may be commanded closed while electric booster 155 is activated. In this way, intake air may flow through turbocharger and through electric booster 155. Once the turbocharger reaches the threshold speed, the electric booster 155 may be turned off, and the electric booster bypass valve 161 may be commanded open. In one example, when the engine is rotated in a reverse direction, the electric booster may also be rotated in a direction opposite to the default direction of rotation in order to create an air flow from the intake manifold 116 to the air induction system 173.

The intake passage 118 may further include the charge air cooler (CAC) 156 (e.g., an intercooler) to decrease the temperature of the turbocharged or supercharged intake gases. In some embodiments, the CAC 156 may be an air to air heat exchanger. In other embodiments, the CAC 156 may be an air to liquid heat exchanger. The CAC 156 may also be a variable volume CAC. Hot charge air (boosted air) from the compressor 126 enters the inlet of the CAC 156, cools as it travels through the CAC, and then exits to pass through the throttle 114 and then enter the engine intake manifold 116. Ambient air flow from outside the vehicle may enter engine 202 through a vehicle front end and pass across the CAC, to aid in cooling the charge air. Condensate may form and accumulate in the CAC 156 when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC 156 housing. The corrosion can lead to leaks between the air charge, the atmosphere, and possibly the coolant in the case of water-to-air coolers. Further, if condensate builds up in the CAC 156, it may be ingested by the engine during times of increased airflow. As a result, unstable combustion and/or engine misfire may occur. The CAC 156 may include a humidity sensor 157 to estimate a level of condensate deposition within the CAC 156. One or more temperature sensors (not shown) may be positioned upstream and downstream of the CAC.

Fuel system 106 may include a fuel tank 128 coupled to a fuel pump system 129. The fuel pump system 129 may include one or more pumps for pressurizing fuel delivered to fuel injectors 232 of engine 112. While only a single fuel injector 232 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154, described further below, via conduit 134, before being purged to the engine intake 23.

Fuel vapor recovery system 154 (herein referred to as evaporative emissions control system, or evaporative emissions system) includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent line 136. In some examples, vent line 136 may include an air filter 259 disposed therein upstream of a canister 104. In some examples, a canister vent valve 199 may be located along vent line 136, coupled between the fuel vapor canister and the atmosphere, and may adjust a flow of air and vapors between canister 104 and the atmosphere. However, in other examples, a canister vent valve may not be included. In one example, operation of canister vent valve may be regulated by a canister vent solenoid (not shown). For example, based on whether the canister is to be purged or not, the canister vent valve may be opened or closed. The canister 104 may include a heater 111 which may be activated during canister purging. By heating the adsorbent material, desorption of the adsorbed fuel vapors may be expedited and purging efficiency may be increased. As described in details in FIG. 3, the heater 111 may also be activated to heat air flowing through the canister during removal of condensate from the CAC 156. The canister 104 may also include a hydrocarbon sensor (not shown) to estimate the load (amount of) hydrocarbons contained in the canister.

A hydrocarbon sensor 198 may be present in evaporative emissions system 154 to indicate the concentration of hydrocarbons in vent line 136. A probe (e.g., sensing element) of hydrocarbon sensor 198 is exposed to and senses the hydrocarbon concentration of fluid flow in vent line 136. Hydrocarbon sensor 198 may be used by the engine control system 160 for determining breakthrough of hydrocarbon vapors from main canister 104, in one example.

Furthermore, in some examples, one or more oxygen sensors 121 may be positioned in the engine intake 116, or coupled to the canister 104 (e.g., downstream of the canister), to provide an estimate of canister load. In still further examples, one or more temperature sensors may be coupled to and/or within canister 104. As fuel vapor is adsorbed by the adsorbent in the canister, heat is generated (heat of adsorption) Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Conduit 134 may optionally include a fuel tank isolation valve 191. Among other functions, fuel tank isolation valve 191 may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along conduit 150. The quantity and rate of vapors released by CPV 158 may be determined by the duty cycle of an associated CPV solenoid (not shown). In one example, the duty cycle of the CPV solenoid may be determined by controller 166 responsive to engine operating conditions, including, for example, an air-fuel ratio. By commanding the CPV 158 to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent line 136. In this way, an increased amount of vaporized HCs may be stored in fuel vapor canister 104. During a later engine operation, the stored vapors may be released back into the incoming air charge via fuel vapor purging system 171.

Conduit 150 is coupled to an ejector 140 in an ejector system 141 and includes a second check valve (CV2) 170 disposed therein, in conduit 150a, between ejector 140 and CPV 158. Second check valve (CV2) 170 may prevent intake air from flowing through from the ejector into conduit 150a and conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

A conduit 148 may be coupled to ejector 140 at a first port or inlet 142. Ejector 140 includes a second port 144 or inlet coupling ejector 140 to conduit 150a and conduit 150. Ejector 140 is coupled to intake 23 at a position upstream of throttle 114 and downstream of compressor 126 via conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a shut-off valve 214. Shut-off valve 214 is hard-mounted directly to air induction system 173 along conduit 118 at a position between air filter 174 and compressor 126. For example, shut-off valve 214 may be coupled to an existing AIS nipple or other orifice, e.g., an existing SAE male quick connect port, in AIS 173. Shut-off valve 214 is coupled to a third port 146 or outlet of ejector 140. Shut-off valve 214 is configured to close in response to undesired emissions detected downstream of outlet 146 of ejector 140. As shown in FIG. 1, in some examples, a conduit or hose 152 may couple the third port 146 or outlet of ejector 140 to shut-off valve 214. In this example, if a disconnection of shut-off valve 214 with AIS 173 is detected, then shut-off valve 214 may close so air flow from the engine intake downstream of the compressor through the converging orifice in the ejector is discontinued. However, in other examples, shut-off valve may be integrated with ejector 140 and directly coupled thereto.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150a and conduit 150 via port 144 during boosted operating conditions. In particular, a low pressure region is created adjacent to inlet port 144 which may be used to draw purge vapors from the canister into ejector 140.

Ejector 140 includes a nozzle 204 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150a and conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150a and conduit 150.

During select engine and/or vehicle operating conditions, such as after an emission control device light-off temperature has been attained (e.g., a threshold temperature reached after warming up from ambient temperature) and with the engine running, controller 166 may adjust the duty cycle of the CPV solenoid (not shown) and open CPV 158. Pressures within fuel vapor purging system 171 may then draw fresh air through vent line 136, fuel vapor canister 104, and CPV 158 such that fuel vapors flow into conduit 150.

Operating the vehicle system in a first mode may include purging the fuel vapor system 171 based on the engine operating conditions. The operation of ejector 140 within fuel vapor purging system 171 during vacuum conditions will now be described. The vacuum conditions may include intake manifold vacuum conditions. For example, the intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116, as represented by dashed line(s) 103 and 103a. Further, at least a portion of the fuel vapors may flow from conduit 150 into ejector 140 via port 144 via dashed line(s) 103, 103b, and 103c. Upon entering the ejector via port 144, the fuel vapors may flow through nozzle 204 toward port 142. Specifically, the intake manifold vacuum conditions cause the fuel vapors to flow through orifice 213. Because the diameter of the area within the nozzle 204 gradually increases in a direction from port 144 towards port 142, the fuel vapors flowing through the nozzle 204 in this direction diffuse, which raises the pressure of the fuel vapors. After passing through the nozzle 204, the fuel vapors exit ejector 140 through first port 142 and flow through duct 148 to intake passage 118 and then to intake manifold 116, indicated by dashed line 103c.

Next, the operation of ejector 140 within fuel vapor purging system 171 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 213 in nozzle 204 in a direction from port 142 towards outlet 146. Because the diameter of the nozzle gradually decreases in a direction of this flow, a low pressure zone is created in a region of orifice 213 adjacent to suction inlet 144. The pressure in this low pressure zone may be lower than a pressure in duct 150a and 150. When present, this pressure differential provides a vacuum to conduit 150 to draw fuel vapor from canister 104, as indicated via dashed line(s) 105. This pressure differential may further induce flow of fuel vapors from the fuel vapor canister, through the CPV 158, and into port 144 of ejector 140. Upon entering the ejector, the fuel vapors may be drawn along with the fluid from the intake manifold out of the ejector via outlet port 146 and into intake 118 at a position upstream of compressor 126, as indicated via dashed lines 105a and 105b. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Thus, herein, it may be understood that the fuel vapor canister may be coupled to an air intake of the engine through a first path having a first check valve 153, where the first path may include conduits 150 and 151. Furthermore, it may be understood that the fuel vapor canister may be coupled to an air intake of the engine through a second path having a second check valve 170. The second path may include conduits 150, and 150a. The second path may further include conduits 152, 118, and 148.

Vehicle system 201 may further include a control system 160. Control system 160 is shown receiving information from a plurality of sensors 262 (various examples of which are described herein) and sending control signals to a plurality of actuators 164 (various examples of which are described herein). As one example, sensors 262 may include an exhaust gas sensor 125 (located in exhaust manifold 220) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, a humidity sensor 157 coupled to the CAC 156, and a pressure or air flow sensor 119 in intake conduit 118 upstream of compressor 126. In some examples, pressure sensor 119 may comprise a dedicated barometric pressure sensor. Other sensors such as additional pressure, temperature, humidity, air/fuel ratio, and composition sensors may be coupled to various locations in the vehicle system 100. As another example, actuators 164 may include fuel injectors 232, throttle 114, compressor 126, a fuel pump of pump system 129, etc. The control system 160 may include an electronic controller 166.

The controller may receive input data from the various sensors, process the input data, and trigger the actuators in response to the processed input data based on instruction or code programmed therein corresponding to one or more routines.

FIG. 2B shows a first schematic depiction 260 of the vehicle system 201 operating in a second mode. Operating the vehicle system in the second mode may include, upon conditions being met, removal of condensate accumulated in the charge air cooler 156. Conditions for cleaning the CAC 156 may include a level of condensate accumulation at the CAC 156 being higher than a threshold level and/or a rate of condensate formation at the CAC 156 being higher than a threshold rate. The level of condensate accumulation and/or the rate of condensate formation may be based on one or more of sensed humidity at the CAC (such as via humidity sensor 157), ambient humidity, and ambient temperature. Cleaning of the CAC 156 may be carried out during an engine-off condition when the engine conditions (such as temperature and humidity) have equalized with ambient conditions or upon an engine start following a long engine soak such that the engine conditions are substantially equal to ambient conditions. Further, the cleaning of the CAC may be carried out when the hydrocarbon load on the canister 104 is lower than a threshold load.

Figure 4:
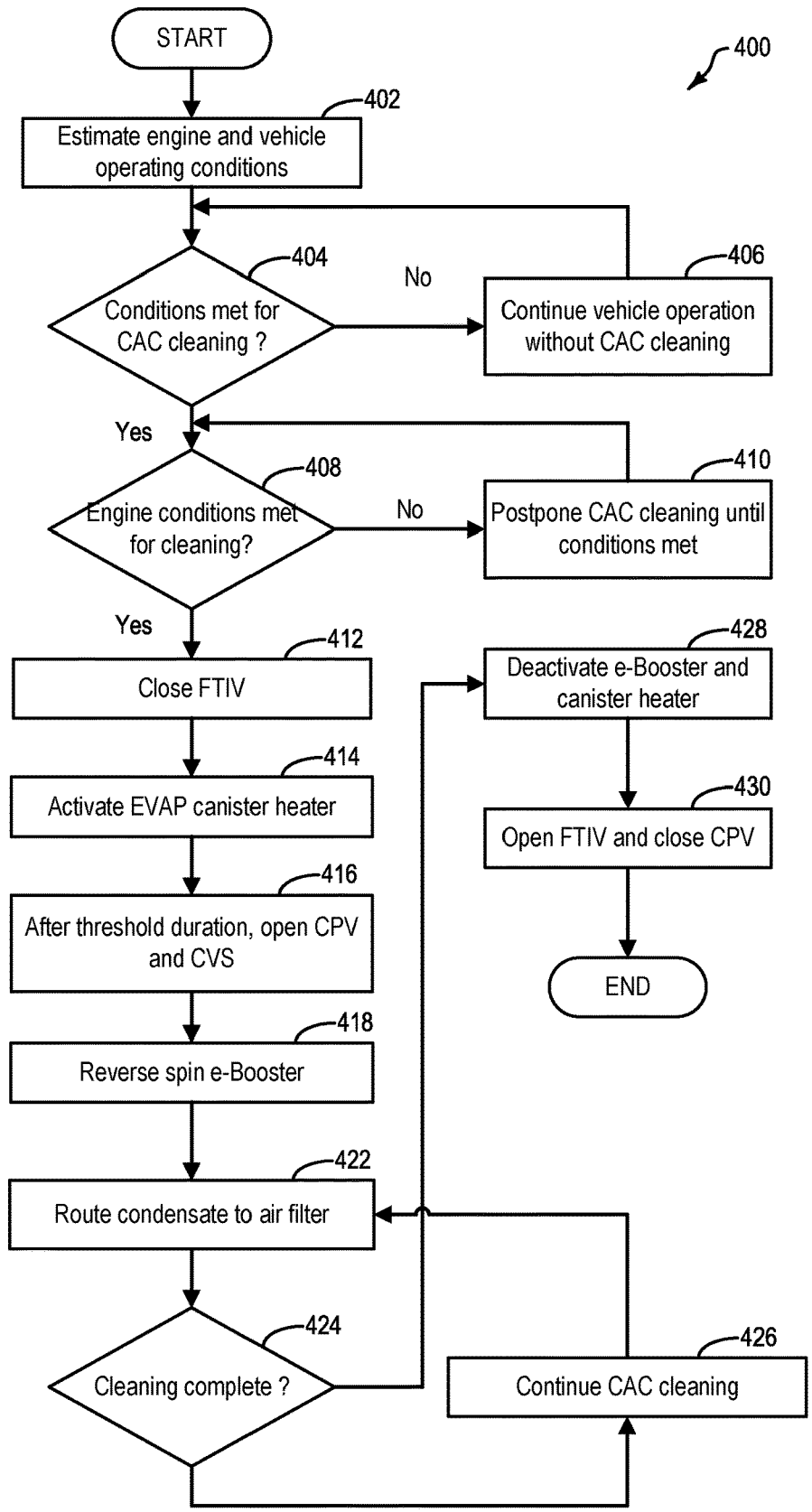
FIG. 4 shows a flowchart for an example method for removal of condensate from the charge air cooler.

During removal of condensate from the CAC 156, the fuel vapor canister 104 may be isolated from the fuel tank by closing the fuel tank isolation valve 191 and the heater 111 coupled to the fuel vapor canister 104 may be activated. After operating the heater for a threshold duration, fluidic communication between atmosphere and the CAC 156 may be established via the heated fuel vapor canister 104 by opening each of the CVV 199 and the CPV 158. The bypass valve 161 is actuated to a closed position and the electric booster 155 may be operated in a reverse direction to generate a vacuum in the intake passage 118. As such, the electric booster may be operated in a first, forward direction during engine operation generating a higher pressure in the intake system. The speed of rotation of the electric booster may be lower during reverse rotation of the booster relative to the speed of the electric booster during a forward rotation of the booster. Air from the atmosphere may be routed to the fuel vapor canister 104 via the open CVV 199, the air may then be heated at the canister, and then the air may flow to the CAC via the CPV 158. Due to the vacuum generated at the intake passage 118, the first check valve 153 may open and the heated air may be sucked into the intake manifold and routed through the CAC 156. Condensate from the CAC 156 may be removed to the air filter 174 of the intake passage, the condensate vaporizing at the CAC and/or at the air filter. The air filter 174 may include a hydrocarbon trap for capturing any fuel vapor desorbed from the fuel vapor canister 104 that may be been routed to the air filter 174 along with the heated air and the CAC condensate. The direction of air flow through the EVAP system and the intake system during CAC cleaning is shown by the dashed lines 203. An example method for removal of condensate from the charge air cooler 156 is shown in FIG. 4.

Figure 3A:
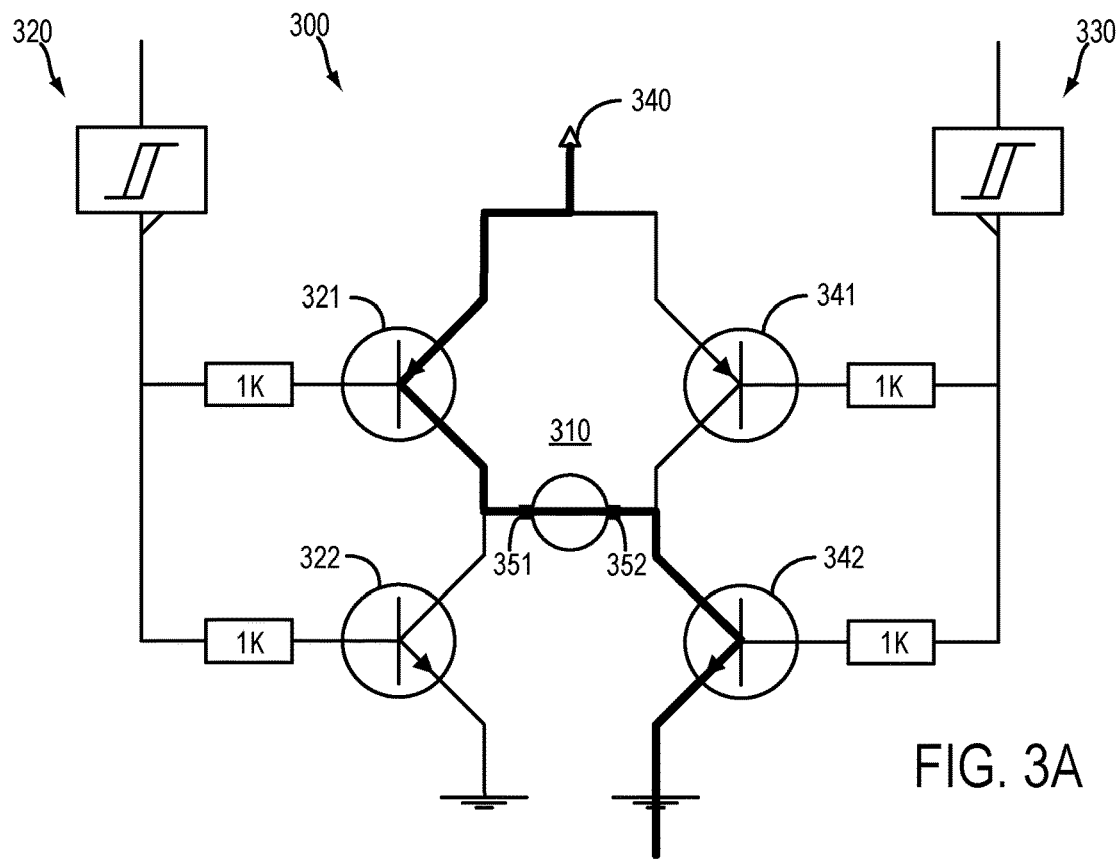
FIGS. 3A and 3B schematically show an example H-bridge circuit which may be used to rotate the electric booster in a forward or reverse direction.
Figure 3B:
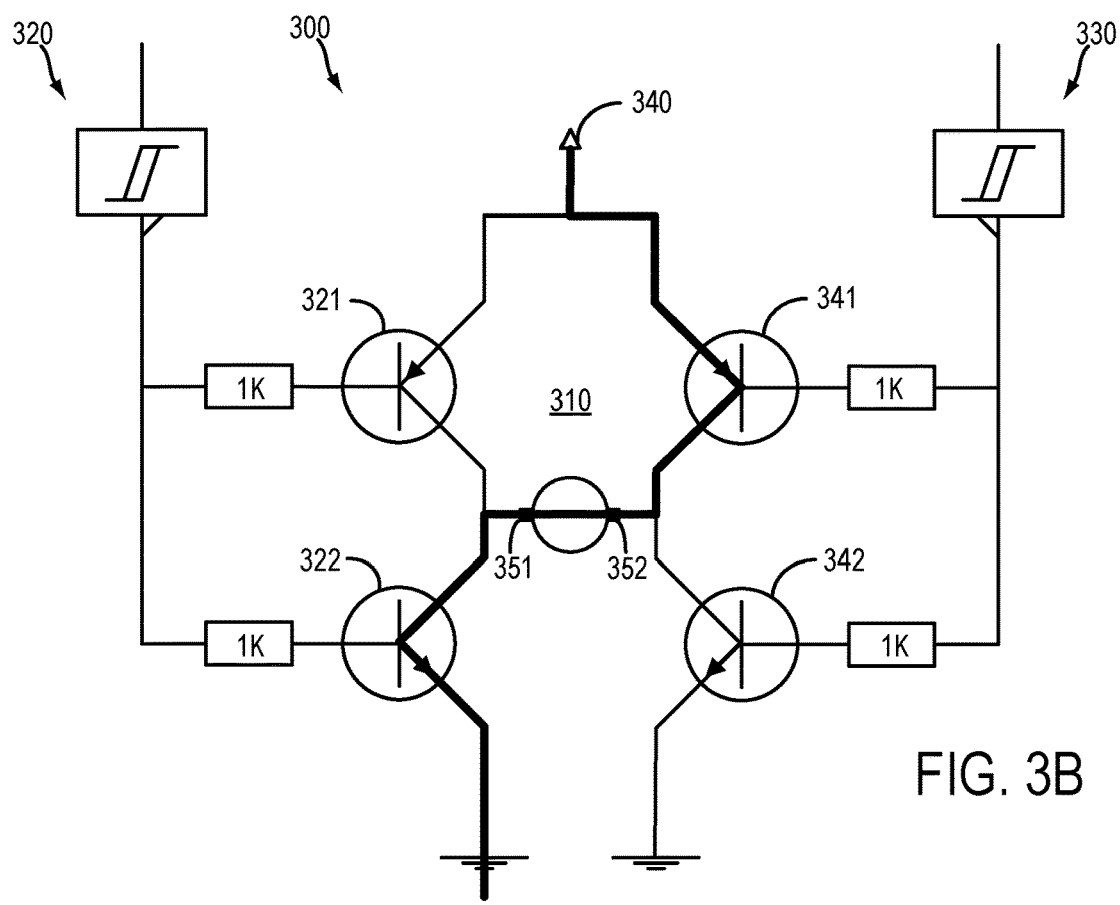

FIGS. 3A and 3B show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 342 are activated (energized), while transistors 322 and 341 are off. In this configuration, the left lead 351 of motor 310 is connected to power source 340, and the right lead 352 of motor 310 is connected to ground. In this way, motor 300 may run in a forward (or default) direction. When operating the electric booster in a forward direction via the motor, the electric booster may be operated to provide boost pressure (causing an increase in pressure at the intake manifold). Additionally and/or alternatively, when operating the electric booster in a forward direction via the motor, the engine (and motor or another motor) may be in a drive mode to drive the vehicle.

In FIG. 3B, transistors 322 and 341 are activated (energized), while transistors 321 and 342 are off. In this configuration, the right lead 352 of motor 310 is connected to power source 340, and the left lead 351 of motor 310 is connected to ground. In this way, motor 310 may run in a reverse direction. When operating the electric booster in a forward direction via the motor, the intake manifold may be evacuated causing a decrease in pressure (generation of vacuum) in the intake manifold.

In this way, the components of FIGS. 1-3A-B provide for a system for a hybrid vehicle comprising: an engine operable under boosted and natural aspiration conditions, and a controller storing instructions in non-transitory memory that, when executed, cause the controller to: during a first condition, operate an electric booster, via an electric motor powered by an on-board battery, in a first, forward direction to increase boost pressure in an engine intake system; and during a second condition, operate the electric booster, via the electric motor powered by the on-board battery, in a second, reverse direction to evacuate the engine intake system, and draw in heated air from an evaporative emissions control system via a charge air cooler (CAC) housed in the engine intake system, the heated air removing accumulated condensate from the CAC. The first condition may include engine operation with a higher than threshold engine load, and the second condition may include cleaning of CAC condensate during an engine-off condition.

FIG. 4 shows an example method 400 that may be implemented for removal of condensate from a charge air cooler (such as CAC 156 in FIG. 2) coupled to an intake passage downstream of a compressor (such as compressor 126 in FIG. 2) and an electric booster (such as e-Booster 155 in FIG. 2). Instructions for carrying out method 400 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

Method 400 begins at 402 by estimating and/or measuring engine and vehicle operating conditions. Engine and vehicle operating conditions may include vehicle speed, engine speed and load, ambient humidity, ambient temperature, ambient pressure, conditions of the CAC (humidity, pressure, temperature), mass air flow (MAF, a position of the throttle, torque demand, EGR flow, compressor inlet pressure, etc.

At 404, the routine includes determining if conditions are met for cleaning the CAC such as by removing condensate accumulated at the CAC. As an example, a level of condensate at the CAC may be determined. This may include retrieving details such as ambient air temperature, ambient air humidity, CAC inlet and outlet charge air temperature, CAC inlet and outlet charge air pressure, and air mass flow rate from a plurality of sensors, and a CAC humidity sensor (such as sensor 157 in FIG. 2), and determining the amount of condensate formed in the CAC based on the retrieved data. Alternatively, the method may include determining the propensity to form condensate. Said another way, the method may include determining if condensate forming conditions are present. For example, if the CAC temperature is above a threshold, ambient humidity is above a threshold, and/or it is raining, condensate formation may be likely at the CAC.

In one example, the rate of condensate formation within the CAC may be based on ambient temperature, CAC outlet temperature, mass flow, EGR, and humidity. In another example, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

In one example, if an onboard sensor registers humidity higher than 20%, then it may be inferred that conditions are met for CAC cleaning. Based on output from on-board sensors and/or information attained wirelessly from an external source (such as a network cloud), the controller may monitor or compute a dew point based on air temperature and relative humidity. If dew is anticipated during an upcoming vehicle soak, then then it may be inferred that conditions are met for CAC cleaning.

Conditions for CAC cleaning may include the level of condensate at the CAC being higher than a threshold or the rate of condensate formation being higher than a threshold rate. Conditions for CAC cleaning may also include a threshold duration or distance of travel since an immediately previous CAC cleaning. As an example, the threshold duration may be in a range of 1-4 days and the threshold distance may be in a range of 50-70 miles.

If it is determined that conditions are not met for CAC cleaning, at 406, vehicle operation may be continued without initiation of a CAC cleaning routine. If it is determined that conditions are met for CAC cleaning, at 408, the routine includes determining if engine operating conditions are met for initiation of the CAC cleaning routine. The conditions for a CAC cleaning routine may include an engine-off event when engine torque is not being used for propelling the vehicle. During an engine-off event, the e-Booster is not operated to provide boost pressure. The conditions for a CAC cleaning routine may also include an engine-on event following a longer vehicle soak allowing for engine conditions (such as temperature/humidity) to equilibrate with ambient conditions. Also, for the CAC cleaning routine, each of the engine cylinders may be parked in a position to minimize communication between intake manifold and exhaust manifold. As an example, for each cylinder, either the intake valve or the exhaust valve may be maintained in a closed position during parking of the cylinder to ensure lack of communication between the intake and the exhaust manifold.

The conditions for a CAC cleaning routine may further include a lower than threshold load on a fuel vapor canister (such as canister 104 in FIG. 2) of the EVAP system. In one example, the canister load may be inferred based on feedback from a canister sensor, such as a pressure sensor, a hydrocarbon sensor, etc. In another example, the canister load is inferred based on engine operating conditions such as a duration of engine operation since a last purging of the canister, and an average engine load and combustion air-fuel ratio over the duration. Further still, besides the HC sensor and pressure sensor, a temperature sensor embedded in the carbon bed may also be used to estimate the canister loading state. The threshold load may correspond to a load below which there would not be an increase in undesired emissions while cleaning the CAC. As an example, during the CAC, a canister heater (such as heater 111 in FIG. 2) is activated and if the canister is loaded above the threshold loading while being heated, the possibility of fuel vapors from being desorbed from the canister may increase.

If it is determined that engine conditions are not met for CAC cleaning, at 410, the CAC cleaning routine may be postponed until the conditions are met. If it is determined that conditions are met for CAC cleaning, at 412, a fuel tank isolation valve (such as FTIV 191 in FIG. 2) housed in a conduit coupling the fuel tank to the fuel vapor canister may be closed to isolate the fuel tank from the fuel vapor canister and the engine intake system.

At 414, the heater coupled to the fuel vapor canister of the EVAP system may be activated. The controller may send a signal to the actuator of the heating element of the heater to activate operation of the heating element. By activating the heater, air within the canister and the surrounding EVAP system components may be heated. The canister may be heated for a threshold duration to ensure sufficient heat generation. The threshold duration may be based on ambient temperature. Once the threshold duration has elapsed, at 416, a canister purge valve (such as CPV 158 in FIG. 2) coupled to a purge line may be actuated to an open position to establish fluidic communication between the canister and the intake manifold. Also, a canister vent valve (such as CVV 199) housed in a vent line of the canister may be actuated to establish fluidic communication between the canister, the intake manifold, and the atmosphere. Air may enter the EVAP system via the open CVV, get heated while flowing through the canister and then flow to the intake manifold and the CAC via the open CPV.

At 418, the electric booster may be rotated in a reverse direction. During conditions when the boost pressure provided by operating the turbocharger is lower than a desired boost pressure, the electric booster may be operated in a forward, default direction, to provide the desired boost. Reverse rotation of the electric booster creates a lower pressure at the intake manifold, thereby facilitating air flow from the EVAP system to the intake manifold via the fuel vapor canister. The controller may send a signal to the electric booster actuator to actuate the electric booster using energy from the energy storage device (such as energy storage device 250 in FIG. 2) coupled to the electric booster. A speed of reverse rotation of the electric booster may be lower than a speed of rotation of the electric booster when operated to compensate for the lag of the mechanical turbocharger. In one example, the speed of reverse rotation of the electric booster may be 2500 RPM. By operating the electric booster at a lower speed, power consumption may be reduced and noise generation during operation of the electric booster may also be reduced.

At 422, condensate deposited in the CAC may be routed to an air filter (such as air filter 174 in FIG. 2). As the e-Booster is operated in a reverse direction, a lower pressure (vacuum) may be generated in the intake system. Ambient air may enter the EVAP system via the CVS and flow through the canister where the air may be heated (via the active canister heater). This vacuum in the intake system may draw in the heated air from the canister into intake manifold upstream of the CAC. The heated air may then flow through the CAC, thereby drying the condensate (with thermal energy form the air). Also, the airflow through the CAC may drive out any remaining condensate and route the condensate to the intake air filter where the condensate may vaporize. In this way, an entire volume of condensate deposited within a CAC may be purged. The intake air filter may include a hydrocarbon trap to ensure that any fuel vapor desorbed from the canister and travel to the intake manifold may be absorbed before the air escapes to the atmosphere via the air induction system. In this way, undesired emissions may be reduced.

At 424, the routine includes determining if cleaning of the CAC is complete. A time desired for completion of the cleaning routine may be determined based on the degree of condensate accumulation in the CAC. As an example, the desired time for completion of cleaning may be proportional to the degree of condensate accumulation. If it is determined that the cleaning is not complete, at 426, the cleaning routine may be continued with the e-Booster reverse rotating and the canister heater active.

If it is determined that the CAC cleaning routine is complete, it may be inferred that heated air flow through the CAC may be suspended. Therefore, at 428, each of the e-Booster and the canister heater may be deactivated. Upon deactivation of the e_Booster, vacuum generation in the intake system may reduce (pressure may increase), thereby lowering airflow from the EVAP system to the CAC. Cleaning of the CAC may also be suspended by deactivating the e-Booster and the canister heater upon conditions such as engine start during the cleaning routine. At 430, the FTIV may be opened to re-establish fluidic communication between the fuel tank and the fuel vapor canister such that fuel vapor from the fuel tank may be stored in the canister. Also, the CPV may be closed such that fuel vapor from the canister may not enter the engine intake manifold.

In this way, in response to conditions being met for cleaning of a charge air cooler (CAC) housed in an intake passage, a heater coupled to an evaporative emissions control (EVAP) system fuel vapor canister may be operated for a threshold duration, then an electric booster coupled to the intake passage may be operated in a reverse direction to generate a vacuum in the intake passage, and heated air may be routed through the CAC to remove condensate deposited in the CAC.

Figure 5:
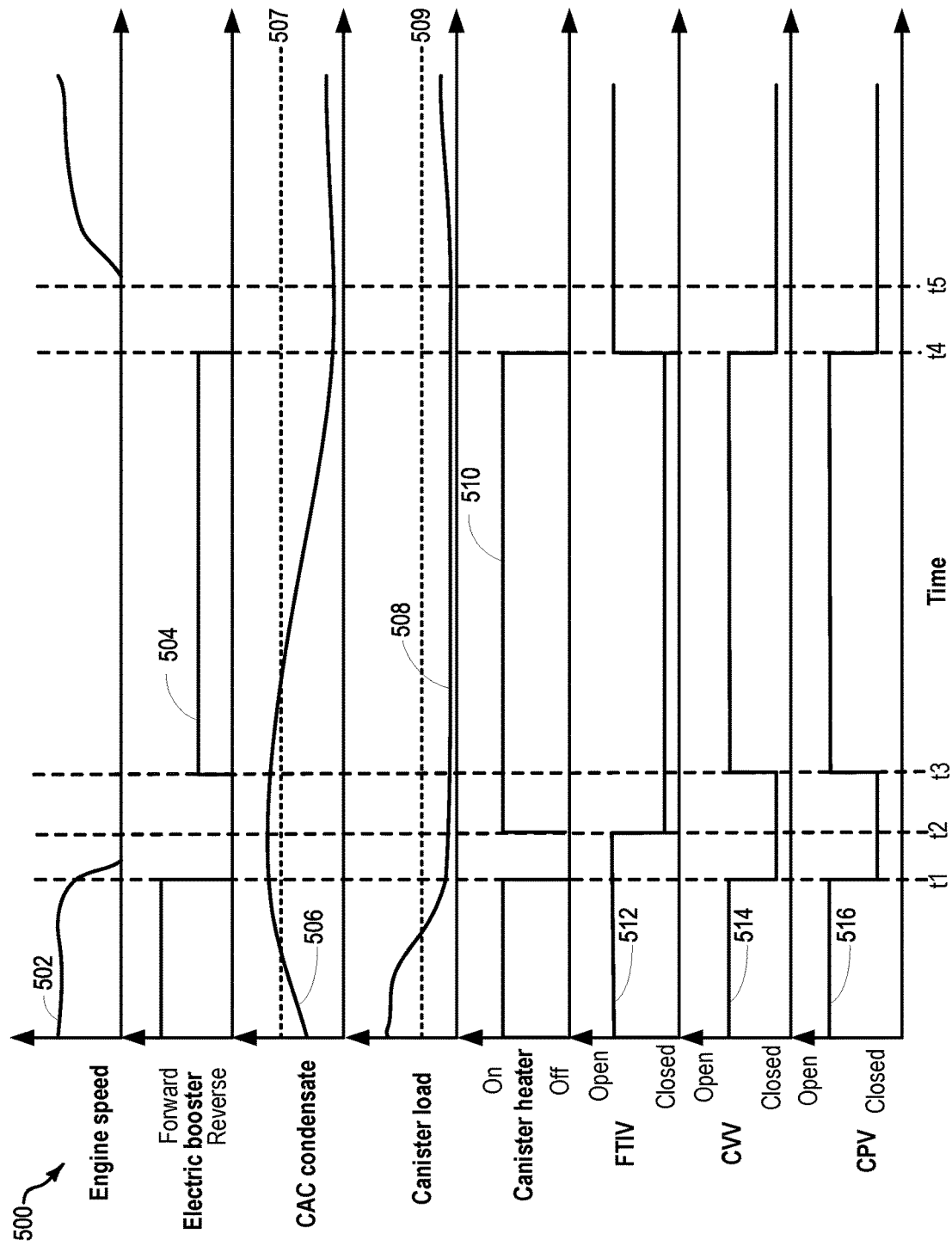
FIG. 5 shows an example purging of the charge air cooler.

FIG. 5 shows an example timeline 500 illustrating purging of a charge air cooler (such as CAC 156 in FIG. 2) coupled to an intake system of engine in a vehicle. The horizontal (x-axis) denotes time and the vertical markers t1-t5 identify significant times in the routine for removing condensate from the CAC.

The first plot, line 502, shows variation in engine speed over time. The second plot, line 504, shows a direction of rotation of an electric booster (such as electric booster 155 in FIG. 2) coupled to a conduit parallel to the intake manifold downstream of an intake compressor and upstream of the CAC. The electric booster may be rotated in a forward direction or a reverse direction by reversing a circuit of an actuator coupled to the electric booster, the electric booster powered via an onboard energy storage device. The forward direction of rotation of the electric booster is opposite to the reverse direction of rotation of the electric booster. The third plot, line 506, shows a level of condensate accumulated in the CAC as estimated via an output of a humidity sensor coupled to the CAC. Dashed line 507 denotes a threshold level above which the CAC is desired to be cleaned and purged of the accumulated condensate. The fourth plot, line 508, shows a level of hydrocarbon loading in a fuel vapor canister (such as canister 104 in FIG. 2) of the evaporative emissions control system. Dashed line 509 denotes a threshold loading above which CAC cleaning may not be carried out. The fifth plot, line 510, shows operation of a heater (such as heater 111 in FIG. 1) coupled to the fuel vapor canister. The sixth plot, line 512, shows opening of a fuel tank isolation valve (such as FTIV 191 in FIG. 2) coupled to a fuel line connecting a fuel tank to the fuel vapor canister. The seventh plot, line 514, shows opening of a canister vent valve (such as CVV 199 in FIG. 2) housed in a canister ventilation path. The eighth plot, line 516, shows opening of a canister purge valve (such as CPV 158 in FIG. 2) coupled to a canister purge line of the evaporative emissions control system. The canister purge line couples the intake passage to the canister of the EVAP system. If each of the CPV and the CVV are opened, a flow path between the intake manifold and the atmosphere is established through the canister purge line and the canister ventilation path.

Prior to time t1, the engine is operated to propel the vehicle. The electric booster is rotated in a forward direction to provide boost pressure to the engine cylinders. Due to the operation of the electric booster in a forward direction, a higher pressure is generated at the intake manifold. The CVV and the CPV are actuated to their respective open positions to allow purging of the canister to remove the hydrocarbon load to the engine cylinders where the hydrocarbon is combusted. The FTIV is maintained open to allow fuel vapor from the fuel tank to enter the canister and consequently be purged to the combustion chambers. The canister heater is operated to facilitate desorption of hydrocarbons stored in the canister.

At time t1, in response to a decrease in torque demand, the engine is shut down and the engine speed reduces to zero. The electric booster operation and canister heater operation are suspended. The CVS and CPV are actuated to their respective closed positions and purging of hydrocarbons is discontinued. Due to the purging, the canister load has decreased to below the threshold load 509.

At engine shut-down, it is observed that the condensate level in the CAC is higher than the threshold level 507. Therefore, at time t2, a condensate removal routine is initiated. At time t2, the canister heater is activated to heat up the canister for a threshold duration between time t2 and t3. The FTIV is actuated to closed position to disable fluidic communication between the canister and the fuel tank. After completion of the threshold duration, it is inferred that the canister is sufficiently hot to facilitate heating of air flowing through it.

At time t3, the CPV and the CVS are actuated to their respective open positions to establish fluidic communication between atmosphere and the CAC in the intake system via the canister. The electric booster is rotated in a reverse direction to generate vacuum in the intake system upstream of the CAC. The vacuum causes air to be drain in from the atmosphere to the CAC via the heated canister. The air flowing through the heated canister gets heated and then the heated air is routed to the CAC. A part of the condensate at the CAC is vaporized from the heat of the air while the remaining condensate is removed from the CAC and routed to an air filter coupled to the intake passage upstream of the CAC. The condensate can vaporize at the air filter. Between time t3 and t4, a decrease in CAC condensate level is observed.

Removal of condensate is continued for a threshold duration such as from time t3 to time t4. The threshold duration is estimated based on the condensate level in the CAC at time t3. Upon completion of the condensate removal routine, the condensate level at the CAC is significantly below the threshold level 507. At time t3, the each of the CPV and the CVV are actuated to their respective closed positions to disable fluidic communication between the atmosphere and the CAC. The FTIV is actuated to an open position to allow fuel vapors from the fuel tank to be stored in the canister. Also, the heater canister is deactivated since further heating of the canister is no longer desired.

The engine is maintained in an off condition until time t5. In response to an increase in torque demand, at time t5, the engine is started and is driven by combustion. Based on a lower torque demand, the electric booster is maintained in a deactivated condition. The engine is continued to be operated with the canister heater deactivated until the subsequent canister purge.

In this way, by generating vacuum at the intake passage, air flow may be routed through the CAC to effectively remove accumulated condensate. The technical effect of heating the air passing through the CAC is that the thermal energy may be used to vaporize at least a portion of the condensate at the CAC or the air filter. By including a hydrocarbon trap at the air filter, any fuel vapor escaping the canister may be trapped without an increase in undesired emissions. Overall, by periodically and/or opportunistically cleaning CAC, engine operation and fuel efficiency may be improved.

An example method for an engine of a vehicle, comprises: flowing heated air from a fuel vapor canister of an evaporative emissions control (EVAP) system through a charge air cooler (CAC) in an intake system to vaporize condensate in the CAC, the air heated at the fuel vapor canister by operating a canister heater. In the preceding example, the method further comprising, additionally or optionally, operating an electric booster coupled to the intake system upstream of the CAC in a second, reverse direction generating a lower pressure in the intake system. In any or all of the preceding examples, additionally or optionally, the electric booster is operated in a first, forward direction during engine operation generating a higher pressure in the intake system. In any or all of the preceding examples, additionally or optionally, flowing the heated air through the CAC includes flowing air into the EVAP system from atmosphere via a canister vent valve, heating the air while routing the air through the fuel vapor canister, and then flowing the heated air from the fuel vapor canister to the CAC via a canister purge valve. In any or all of the preceding examples, the method further comprising, additionally or optionally, routing the condensate from the CAC to an air filter coupled to the intake system upstream of the CAC, the condensate vaporizing at the air filter. In any or all of the preceding examples, additionally or optionally, the flowing of air is carried out in response to one or more of a higher than threshold humidity at the CAC, a higher than threshold ambient humidity, and a lower than threshold ambient temperature. In any or all of the preceding examples, additionally or optionally, the flowing of air is carried out during an engine-off condition when a canister load is lower than a threshold load. In any or all of the preceding examples, the method further comprising, additionally or optionally, during a subsequent engine-on condition, operating the canister heater for purging fuel vapor from the fuel vapor canister to engine cylinders.

Another example for an engine in a vehicle, comprises: in response to conditions being met for cleaning of a charge air cooler (CAC) housed in an intake passage, operating a heater coupled to an evaporative emissions control (EVAP) system fuel vapor canister for a threshold duration, then operating an electric booster coupled to the intake passage in a reverse direction to generate a vacuum in the intake passage, and routing heated air through the CAC to remove condensate deposited in the CAC. In the preceding example, additionally or optionally, the conditions for cleaning the CAC include a level of condensate accumulation at the CAC being higher than a threshold level and/or a rate of condensate formation at the CAC being higher than a threshold rate. In any or all of the preceding examples, additionally or optionally, the level of condensate accumulation and/or the rate of condensate formation is based on one or more of sensed humidity at the CAC, ambient humidity, and ambient temperature. In any or all of the preceding examples, additionally or optionally, the conditions for cleaning the CAC further include an engine-off condition and a lower than threshold load at the fuel vapor canister. In any or all of the preceding examples, the method further comprising, additionally or optionally, prior to operating the heater, isolating the fuel vapor canister form a fuel tank. In any or all of the preceding examples, the method further comprising, additionally or optionally, after a threshold duration of operating the heater, establishing fluidic communication between atmosphere and the CAC via the heated fuel vapor canister. In any or all of the preceding examples, additionally or optionally, routing heated air through the CAC includes, routing air from the atmosphere to the fuel vapor canister, heating the air at the canister, then flowing the air to the CAC, and removing condensate from the CAC to an air filter of the intake passage, the condensate vaporizing at the CAC and/or at the air filter. In any or all of the preceding examples, additionally or optionally, the CAC is positioned in the intake passage downstream of each of a turbocharger compressor and the electric booster, and upstream of the air filter.

Another example for a vehicle, comprises: an engine operable under boosted and natural aspiration conditions, and a controller storing instructions in non-transitory memory that, when executed, cause the controller to: during a first condition, operate an electric booster, via an electric motor powered by an on-board battery, in a first, forward direction to increase boost pressure in an engine intake system, and during a second condition, operate the electric booster, via the electric motor powered by the on-board battery, in a second, reverse direction to evacuate the engine intake system, and draw in heated air to the engine intake system from an evaporative emissions control system via a charge air cooler (CAC) housed in the engine intake system, the heated air removing accumulated condensate from the CAC. In any or all of the preceding examples, additionally or optionally, the first condition includes engine operation with a higher than threshold engine load, and wherein the second condition includes cleaning of CAC condensate during an engine-off condition. In any or all of the preceding examples, the system further comprising, additionally or optionally, a heating element coupled to a fuel vapor canister of an engine evaporative emissions control system of the engine, the heating element activated during the second condition to heat air flowing from atmosphere to the CAC via the fuel vapor canister. In any or all of the preceding examples, the system further comprising, additionally or optionally, an air filter including a hydrocarbon trap coupled to the engine intake system upstream of each of the CAC and the electric booster, the condensate removed from the CAC vaporized at the air filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
operating an electric booster coupled to an intake system, upstream of a compressor, in a second, reverse direction generating a lower pressure in the intake system; and
flowing heated air from a fuel vapor canister of an evaporative emissions control (EVAP) system through a charge air cooler (CAC) in the intake system to vaporize condensate in the CAC, the air heated at the fuel vapor canister by operating a canister heater.

2. The method of claim 1, wherein the electric booster is operated in a first, forward direction during engine operation generating a higher pressure in the intake system.

3. The method of claim 1, wherein flowing the heated air through the CAC includes flowing air into the EVAP system from atmosphere via a canister vent valve, heating the air while routing the air through the fuel vapor canister, and then flowing the heated air from the fuel vapor canister to the CAC via a canister purge valve.

4. The method of claim 1, further comprising, routing the condensate from the CAC to an air filter coupled to the intake system upstream of the CAC, the condensate vaporizing at the air filter.

5. The method of claim 1, wherein the flowing of air is carried out in response to one or more of a higher than threshold humidity at the CAC, a higher than threshold ambient humidity, and a lower than threshold ambient temperature.

6. The method of claim 1, wherein the flowing of air is carried out during an engine-off condition when a canister load is lower than a threshold load.

7. The method of claim 1, further comprising, during a subsequent engine-on condition, operating the canister heater for purging fuel vapor from the fuel vapor canister to engine cylinders.

8. A method for an engine in a vehicle, comprising:
in response to conditions being met for cleaning of a charge air cooler (CAC) housed in an intake passage,
operating a heater coupled to an evaporative emissions control (EVAP) system fuel vapor canister for a threshold duration;
then operating an electric booster coupled to the intake passage, upstream of a compressor, in a reverse direction to generate a vacuum in the intake passage; and
routing heated air through the CAC to remove condensate deposited in the CAC.

9. The method of claim 8, wherein the conditions for cleaning the CAC include a level of condensate accumulation at the CAC being higher than a threshold level and/or a rate of condensate formation at the CAC being higher than a threshold rate.

10. The method of claim 9, wherein the level of condensate accumulation and/or the rate of condensate formation is based on one or more of sensed humidity at the CAC, ambient humidity, and ambient temperature.

11. The method of claim 8, wherein the conditions for cleaning the CAC further include an engine-off condition and a lower than threshold load at the fuel vapor canister.

12. The method of claim 8, further comprising, prior to operating the heater, isolating the fuel vapor canister from a fuel tank.

13. The method of claim 8, further comprising, after a threshold duration of operating the heater, establishing fluidic communication between atmosphere and the CAC via the heated fuel vapor canister.

14. The method of claim 13, wherein routing heated air through the CAC includes, routing air from the atmosphere to the fuel vapor canister, heating the air at the canister, then flowing the air to the CAC, and removing condensate from the CAC to an air filter of the intake passage, the condensate vaporizing at the CAC and/or at the air filter.

15. The method of claim 14, wherein the CAC is positioned in the intake passage downstream of each of a turbocharger compressor and the electric booster, and upstream of the air filter.

16. A system for a vehicle, comprising:
an engine operable under boosted and natural aspiration conditions, and a controller storing instructions in non-transitory memory that, when executed, cause the controller to:
during a first condition, operate an electric booster, via an electric motor powered by an on-board battery, in a first, forward direction to increase boost pressure in an engine intake system; and
during a second condition, operate the electric booster, via the electric motor powered by the on-board battery, in a second, reverse direction to evacuate the engine intake system, and draw in heated air to the engine intake system from an evaporative emissions control system via a charge air cooler (CAC) housed in the engine intake system, the heated air removing accumulated condensate from the CAC, wherein the electric booster is coupled to the engine intake system upstream of a compressor.

17. The system of claim 16, wherein the first condition includes engine operation with a higher than threshold engine load, and wherein the second condition includes cleaning of CAC condensate during an engine-off condition.

18. The system of claim 16, further comprising a heating element coupled to a fuel vapor canister of an engine evaporative emissions control system of the engine, the heating element activated during the second condition to heat air flowing from atmosphere to the CAC via the fuel vapor canister.

19. The system of claim 18, further comprising an air filter including a hydrocarbon trap coupled to the engine intake system upstream of each of the CAC and the electric booster, the condensate removed from the CAC vaporized at the air filter.

* * * * *